US006913230B2

(12) United States Patent
Wells

(10) Patent No.: US 6,913,230 B2
(45) Date of Patent: Jul. 5, 2005

(54) HAIR BRAIDING AND WEAVING ACCESSORY

(76) Inventor: Brenda Lee Wells, 90 Cebra Ave., Staten Island, NY (US) 10304

(*) Notice: Subject to any disclaimer, the term of this patent is extended or adjusted under 35 U.S.C. 154(b) by 0 days.

(21) Appl. No.: 10/364,445

(22) Filed: Feb. 11, 2003

(65) Prior Publication Data

US 2003/0122041 A1 Jul. 3, 2003

Related U.S. Application Data

(63) Continuation-in-part of application No. 09/864,047, filed on May 24, 2001, now abandoned.

(51) Int. Cl.⁷ .............................................. F16M 11/00
(52) U.S. Cl. .................................................... 248/127
(58) Field of Search ............................. 211/207, 205, 211/196; 74/462, 457; 248/127, 371, 161, 410, 157, 176.2

(56) References Cited

U.S. PATENT DOCUMENTS

| | | | |
|---|---|---|---|
| 816,053 A | 3/1906 | Wittbold | |
| 929,897 A * | 8/1909 | Taylor | 211/70 |
| 1,888,324 A * | 11/1932 | Matthai | 211/74 |
| 2,167,572 A * | 7/1939 | How | 4/518 |
| 2,621,663 A | 12/1952 | Jenkins | |
| 2,646,175 A | 7/1953 | Beauvais et al. | |
| 2,954,077 A | 9/1960 | Wanner | |
| 3,472,389 A * | 10/1969 | Lowe | 211/70 |
| 3,591,118 A | 7/1971 | Gentile et al. | |
| 3,601,443 A * | 8/1971 | Jones | 297/188.21 |
| 3,809,383 A | 5/1974 | Ptacek | |
| 4,023,757 A | 5/1977 | Allard et al. | |
| 4,047,502 A | 9/1977 | Gordon, Jr. | |
| 4,214,739 A | 7/1980 | Dailey | |
| D263,780 S * | 4/1982 | Hildebrand et al. | D6/457 |
| 4,380,296 A * | 4/1983 | Murray et al. | 209/704 |
| 5,037,162 A * | 8/1991 | Ransom | 312/236 |
| 5,137,319 A * | 8/1992 | Sauder | 294/159 |
| 5,144,701 A | 9/1992 | Clark | |
| 5,156,365 A | 10/1992 | McCaig et al. | |
| D330,982 S * | 11/1992 | Braun | D6/457 |
| 5,197,394 A * | 3/1993 | Schmidt | 108/50.12 |
| 5,577,344 A | 11/1996 | Zaremba et al. | |
| 5,738,229 A * | 4/1998 | Fairweather | 211/70.2 |
| D394,575 S * | 5/1998 | Mikloczak et al. | D6/552 |
| D395,182 S * | 6/1998 | Singleton | D6/469 |
| 5,819,766 A | 10/1998 | Craigen | |
| 5,819,960 A * | 10/1998 | Bonazza | 211/133.1 |
| 5,839,586 A | 11/1998 | Smith | |
| D408,172 S * | 4/1999 | Nobili | D6/469 |
| 6,061,850 A | 5/2000 | Roper, III | |
| D426,282 S * | 6/2000 | Harmon | D22/147 |
| 6,076,202 A * | 6/2000 | Lockwood | 4/519 |
| D461,084 S * | 8/2002 | Chen | D6/552 |
| 2001/0019095 A1 | 9/2001 | Valiulis | |
| 2002/0175249 A1 * | 11/2002 | Wells | 248/127 |

FOREIGN PATENT DOCUMENTS

FR  2739768 A1 * 4/1997 .......... A47G/23/02

* cited by examiner

Primary Examiner—Leslie A. Braun
Assistant Examiner—A. Joseph Wujciak
(74) Attorney, Agent, or Firm—Epstein Drangel Bazerman & James, LLP

(57) ABSTRACT

A hair braiding and weaving accessory for holding 1–7 packs or bundles of commercial or artificial hair while the hairstylist is braiding or weaving selected small groups of such commercial or artificial hair with a customer's natural hair. The device comprises a base, a pole and a disc. The pole is attached to the base in a conventional manner. The disc has a hole through the middle, the pole is placed through the hole and positioned towards the top of the pole. The plane of the disc is at an angle of approximately forty five (45°) degrees to the pole to allow the commercial or artificial hair to be draped around the pole without falling off the disc. The height of the pole and disc is adjustable.

4 Claims, 5 Drawing Sheets

US 6,913,230 B2

HAIR BRAIDING AND WEAVING ACCESSORY

This application is a continuation-in-part of pending U.S. patent application Ser. No. 09/864,047 filed on May 24, 2001 now abandoned.

BACKGROUND OF THE INVENTION

1. Field of the Invention

The present invention relates generally to a hair braiding and hair weaving accessory for the braiding and weaving of commercial or artificial hair, more particularly, to a device and method which allows a hairstylist to place commercial or artificial hair on a stand, alleviating the need to either place the artificial hair on a counter, chair, over the hairstylist's shoulder or for an assistant to hold the hair while the hairstylist braids or weaves the artificial hair into the customers natural hair.

2. Description of the Prior Art

Today it is common for people to enhance their natural hair by artificial means. One method is to braid or weave commercial or artificial hair to a person's natural hair to give the person's hair a fuller or longer look. The commercial or artificial hair added to a person's natural hair may significantly change the appearance of that person. A person with very short hair may be given the appearance of having very long or thicker fuller hair when the commercial or artificial hair is inserted or added correctly.

The common procedure for braiding or weaving artificial hair to a person's natural hair is time consuming and may take anywhere from 2 to 10 hours to complete. The braiding or weaving of the commercial or artificial hair is performed by taking a small group of strands of the commercial or artificial hair from a pack of hair which is to be added to the customer's natural hair and then each small group is separately braided, interwoven, sewn in, fused or glued with a desired amount of the customer's natural hair in a small area of the customers scalp. A desired amount of strands of commercial or artificial hair is used in each group to give a more realistic appearance to the resulting combination of artificial and natural hair. Between 1 and 6 packs or bundles of commercial or artificial hair are typically used when lengthening or thickening a full head of hair.

During the braiding or weaving process, the entire pack of commercial or artificial hair must be kept clean, organized, controlled and untangled. The working area of a hairstylist does not allow for the placement of commercial or artificial hair where it will remain clean, organized, controlled and untangled. Currently, the only areas for placement of the commercial or artificial hair are the narrow counters at each hair styling station, a chair or over the hairstylist's shoulders. The counter is normally limited in space, covered with other hair styling products contaminated with spillage of the hairstyling products. The limitation in space on a counter, chair or hairstylist's shoulders forces the hairstylist to fold and tangle the artificial hair. This causes the commercial or artificial hair to become tangled, unorganized, uncontrolled and unsanitary. Once these conditions occur, the hair becomes unusable and must be discarded.

It is difficult, and at times impossible for the hairstylist braiding or weaving in the commercial or artificial hair to ones natural hair to hold the entire pack or bundle of commercial or artificial hair during the braiding or weaving process. Until the present invention, few options were available for holding the pack or bundle of commercial or artificial hair awaiting braiding or weaving. One option was for the hairstylist to have an assistant hold the bundle of commercial or artificial hair while the hairstylist braids or weaves a small group of commercial or artificial strands selected from the pack or bundle. This option has very obvious draw backs. Either the consumer or hair stylist will have to absorb the cost of having a person hold artificial hair for an extended period during braiding or weaving. Holding the pack or bundle is both tiring and stressful since the hair must be held in a manner which prevents the hair from touching the ground or becoming tangled. Another option is to have the customer hold the hair during the braiding or weaving procedure. This option is irritating and tiring to the customer.

BRIEF SUMMARY OF THE INVENTION

The present invention is a hair braiding and weaving accessory for holding 1-7 packs or bundles of commercial or artificial hair while the hairstylist is braiding or weaving selected small groups of such commercial or artificial hair with a customer's natural hair. The accessory is configured such that a bundle of commercial or artificial hair may be draped around it in such a manner as to prevent tangling, falling or soiling.

The device comprises a base, a pole and a disc. The pole is attached to the base in a conventional manner. The disc has a hole through the middle, the pole is placed through the hole and positioned towards the top of the pole. The plain of the disc is at an angle of approximately forty five (45) degrees to the pole to allow commercial or artificial hair to be draped around the pole without falling off the disc. The height of the pole and disc is adjustable.

During use, the hairstylist places multiple packs or bundles of hair on the hair braiding and weaving accessory prior to the start of the braiding or weaving process by placing the hair around the pole on top of the disk. As the hairstylist requires more strands of artificial hair to braid or weave with the person's natural hair, he/she removes the desired number of strands and braids or weaves the strands with the customer's natural hair.

The hair weaving accessory has several alternative embodiments. One alternative embodiment is the use of notched tabs around the edge of the disc. The notches allow the hairstylist to have pre-divided groups of strands which were divided prior to the start of the braiding or weaving process. Such pre-division is beneficial because it assures that the same amount of artificial hair is used in each section of the person's natural hair.

DESCRIPTION OF THE PREFERRED EMBODIMENT

Figure 1:
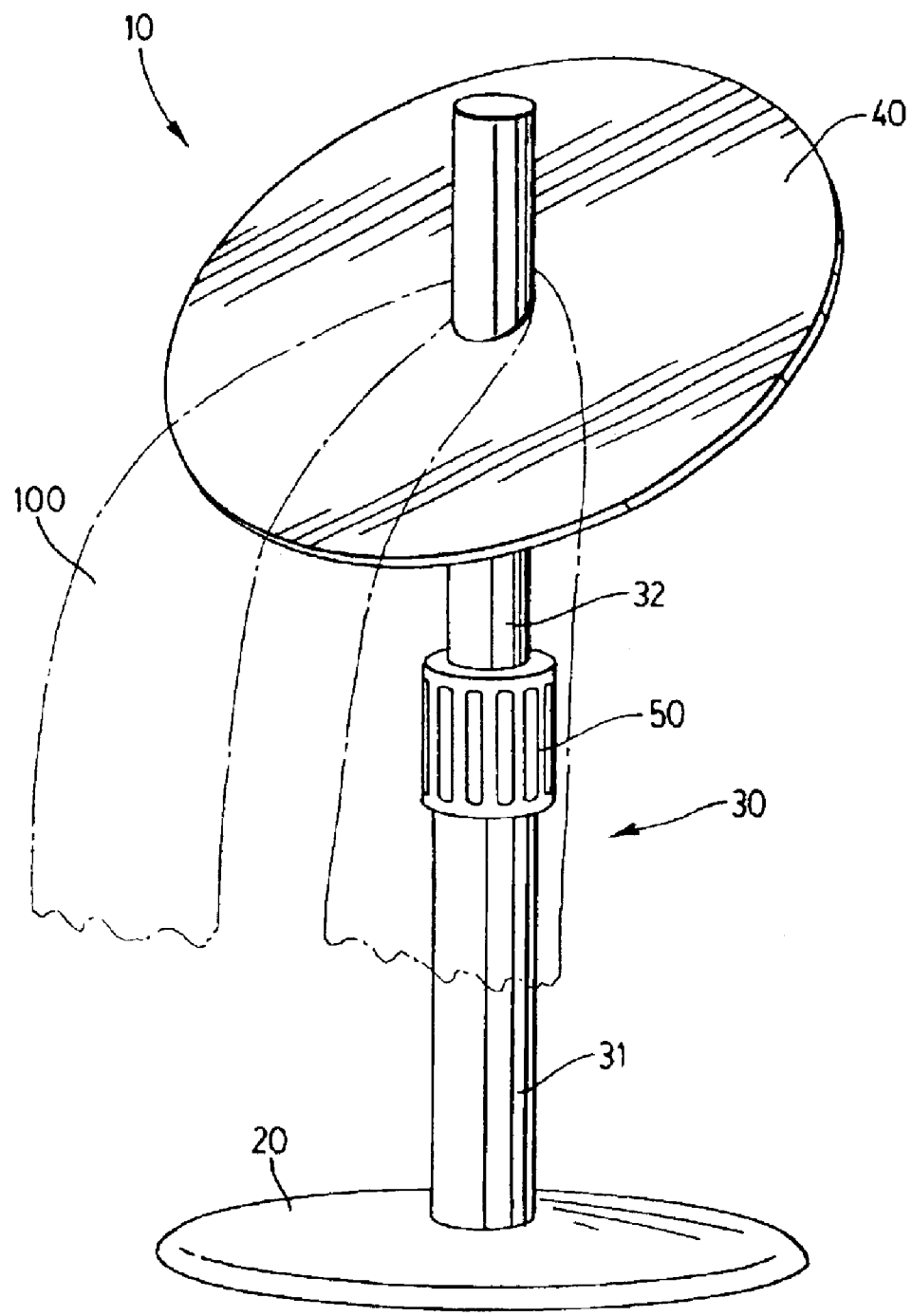
FIG. 1 is a perspective view of an artificial hair. braiding and weaving accessory with artificial hair positioned thereon.

FIG. 1 shows a hair weaving accessory 10 having a floor base 20, a telescopically adjustable pole 30 and an angled disc 40 in accordance with the present invention. The base 20 and pole 30 are connected using any conventional means. The pole 30 may be formed from a single element having a fixed length but it is preferred for the pole 30 to be comprised of two elements 31, 32 to allow the pole to be adjustable in height. The lower section 31 is hollow having an internal diameter greater than the external diameter of the upper section 32, this allows the upper section 32 to slide freely in the lower section 31. The height of the pole 30 is adjusted by varying the length of the upper section 32 positioned in the lower section 31. Different locking mechanisms may be used to hold the upper section 32 in the desired position. In the preferred embodiment, the height is adjusted using a twist locking cam 50 to lock the upper and lower sections 31, 32 at a desired height. It should be noted that additional sections may be used with each section having its own locking cam 50.

Figure 2:
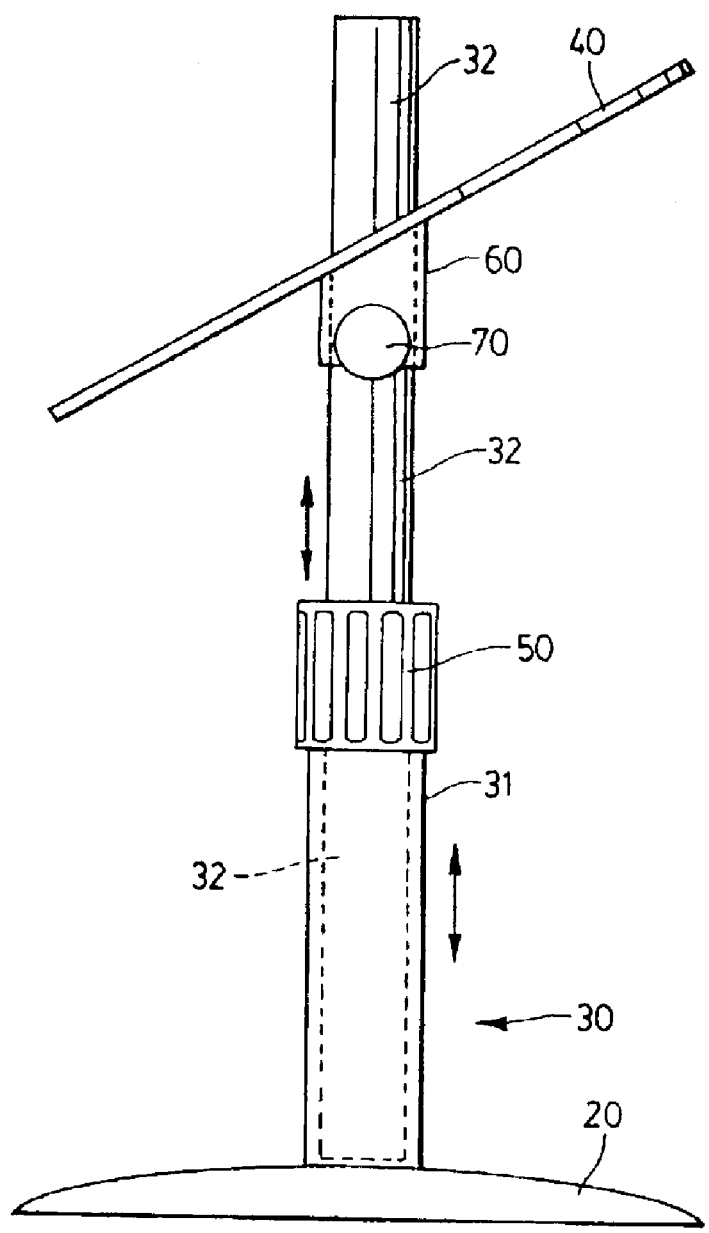
FIG. 2 is a side view of the accessory of FIG. 1.

As seen in FIG. 2, the disc 40 of the present invention is attached to the pole 32 by hollow sleeve 60 which slides over the upper section 32 of the pole 30. The sleeve 60 is attached to the disc 40. The disc 40 has a hole towards its center which is aligned with the hollow sleeve 60, allowing the upper section 32 to be placed through both the sleeve 60 and the disc 40. The sleeve 60 and disc 40 is held in position on the upper section 32 by a screw 70, to prevent the disc 40 from rotating or spinning during use. As seen in FIGS. 1–4, the disc 40 is fixed to the sleeve 60 at an angle of approximately 45 degrees.

During use, the height of the disc 40 may be adjusted by two means. One is by moving the sleeve 60 and the disc 40. Such movement is accomplished by turning the screw 70 to loosen, adjusting the position of the sleeve 60 and then tightening the screw 70 at the final position to hold the disc 40 in place. As previously discussed, the height of the disc 40 may also be adjusted by changing the height of the pole 30 by means of sections 31, 32 and the locking cam 50. The two forms of adjustment are necessary to allow the upper section 32 to extend above the top of the disc 40.

Figure 3:
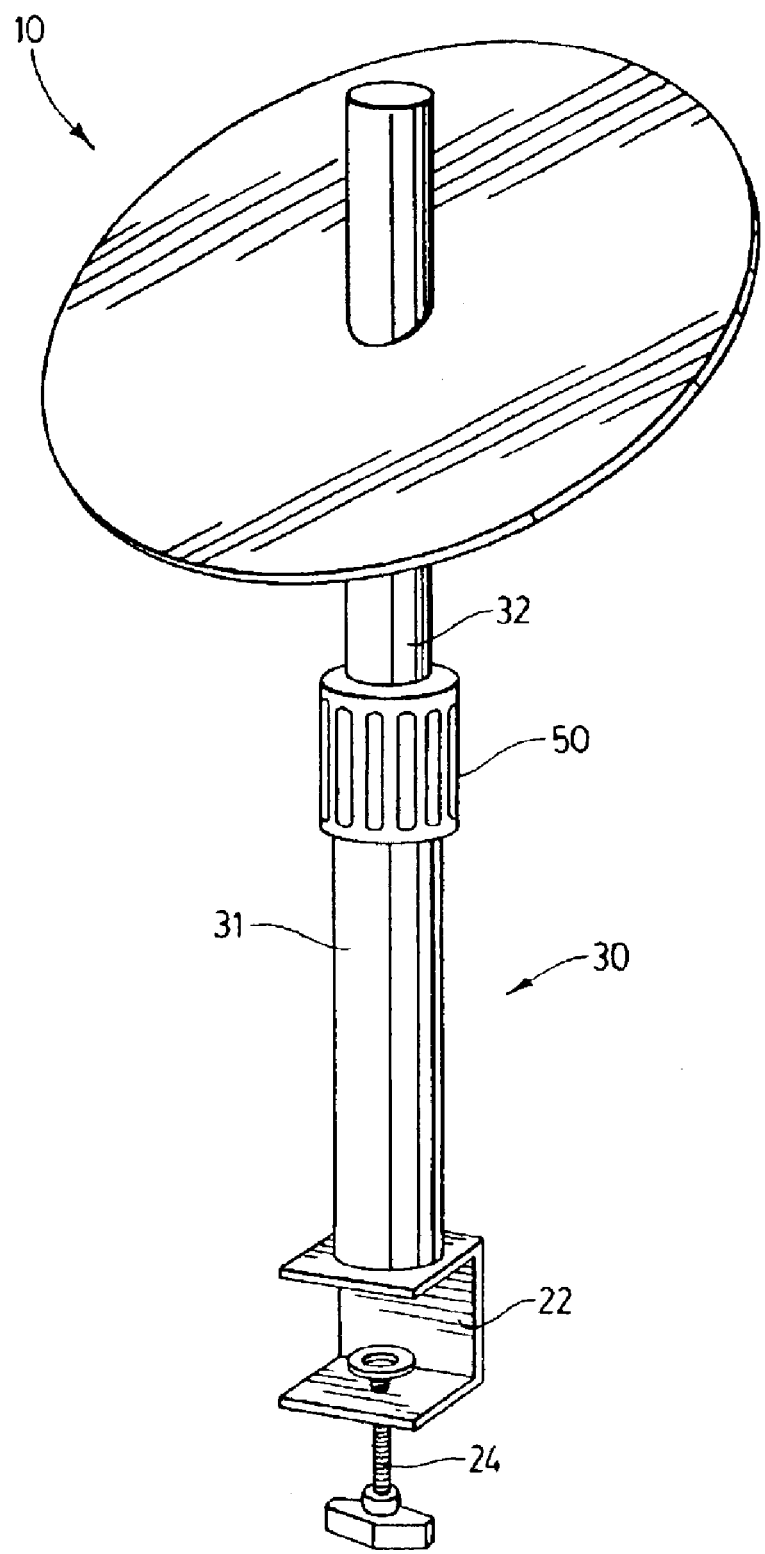
FIG. 3 is a perspective view of another embodiment of the artificial hair braiding and weaving accessory with a table top adaptable base.

As seen most clearly in FIG. 3 an alternate embodiment contains a table mounting base 22. The table mounting base 22 allows the hairstylist to mount the hair braiding and weaving accessory 10 on a table, counter top or chair by sliding the table mounting base 22 over the edge of a table, counter top or chair and turning the tightening screw 24 to hold the hair braiding and weaving accessory 10 in place. While the tightening screw 24 is the preferred embodiment for the table mounting base 22 version of the present invention, several other commonly known alternatives may be used. For example, a lever may be used to apply the force necessary to mount the table mounting base 22 to a table, counter top or chair. Also, the table mounting base 22 may consist of a flange permanently attached to a table.

During use, the hairstylist will open one to several packages of commercial or artificial hair 100 and place them on the hair braiding and weaving accessory 10 around the upper section 32 of the pole 30 protruding above the disc 40. The upper section 32 protruding through the top of the disc 40 prevents the commercial or artificial hair 100 from falling off the disc 40. The length of the upper section 32 which extends beyond the top of the disc 40 will depend on the amount of commercial or artificial hair 100 the hairstylist wishes to place on the hair braiding and weaving accessory 10. When more commercial or artificial hair 100 is placed on the hair braiding and weaving accessory 10, the hairstylist will need a longer length of the upper section 32 to extend beyond the top of the disc 40. With experience, the hairstylist will determine the optimal length of the upper section 32 necessary to protrude through the top of the disc 40. The hairstylist will then remove a small number of strands of the commercial or artificial hair 100 from the hair braiding and weaving accessory 10. The hairstylist then takes the removed strands of artificial hair and braids or weaves them into the person's natural hair. Once the hairstylist has completed braiding or weaving the removed strands of commercial or artificial hair, he/she reaches to remove another small number of strands from the commercial or artificial hair 100 located on the hair braiding and weaving accessory 10. The process is repeated until the hairstylist has completed braiding or weaving the commercial or artificial hair 100 into the customer's natural hair.

The commercial or artificial hair 100 is prevented from falling off the hair braiding and weaving accessory 10 because the disc 40 is mounted at an angle. The angle should be great enough to hold the commercial or artificial hair 100 around the upper section 32. The preferred angle is between 35 degrees and 50 degrees. This ensures that the commercial or artificial hair 100 is held together and the hairstylist need not spend time gathering the hair each time he/she reaches for a small bundle of strands of the artificial hair 100.

Figure 4:
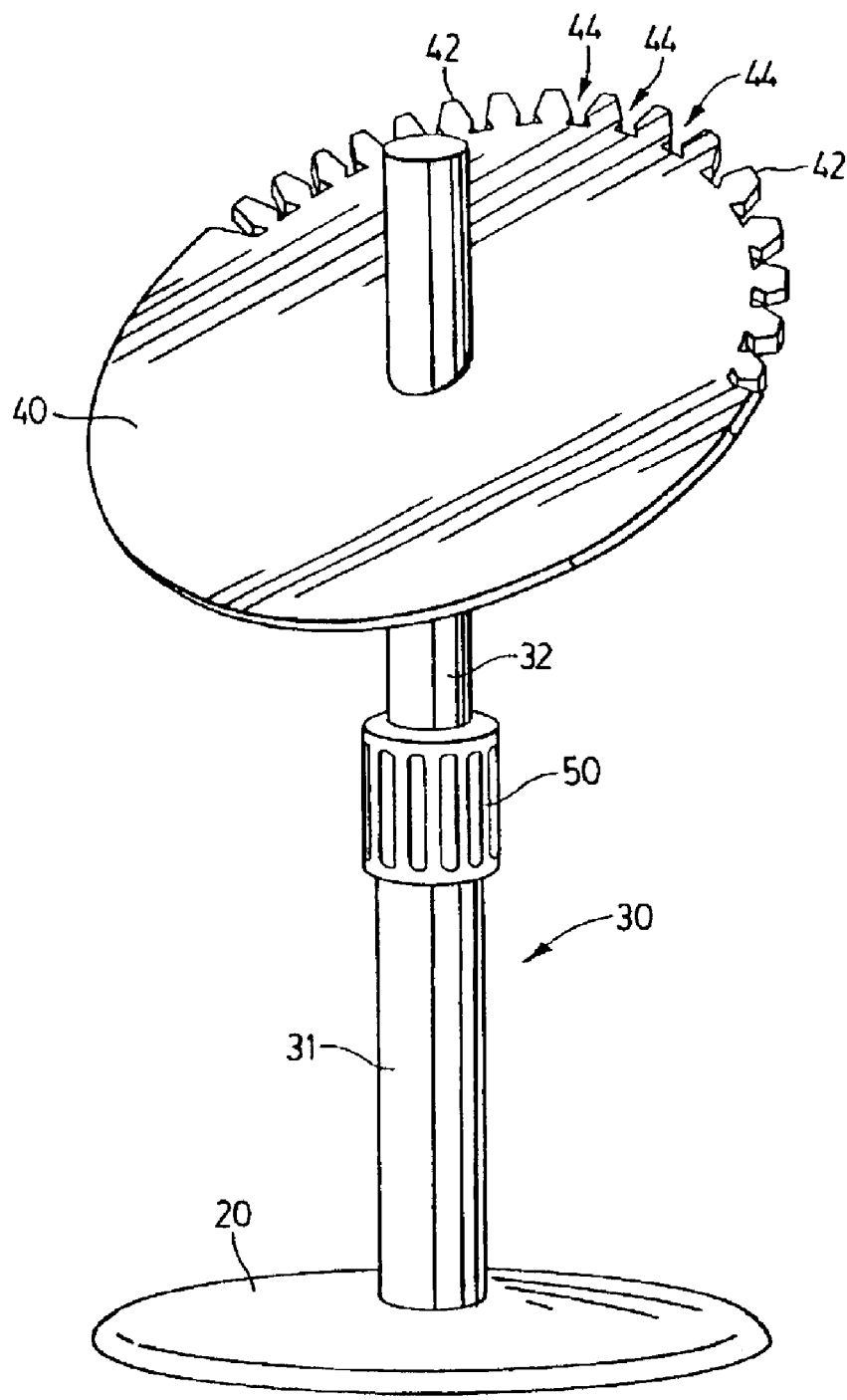
FIG. 4 is a perspective view of the accessory of FIG. 1 having a notched disc.

In an alternate embodiment of the present invention, as seen in FIG. 4, the top of the disc 40 has cutouts or notches 44 forming tabs 42, the tabs 42 are formed around the rim of disc 40. During the braiding or weaving of a person's hair, the hairstylist would normally grab a few strands of commercial or artificial hair from a pack or bundle for braiding or weaving. If the alternate embodiment is used, the hairstylist separates the commercial or artificial hair into pre-divided small groups of strands to save time during braiding or weaving. The embodiment in FIG. 4 keeps such pre-divided small groups separated. Each pre-divided small group is positioned in a separate notch 44 on the disc 40.

Figure 5:
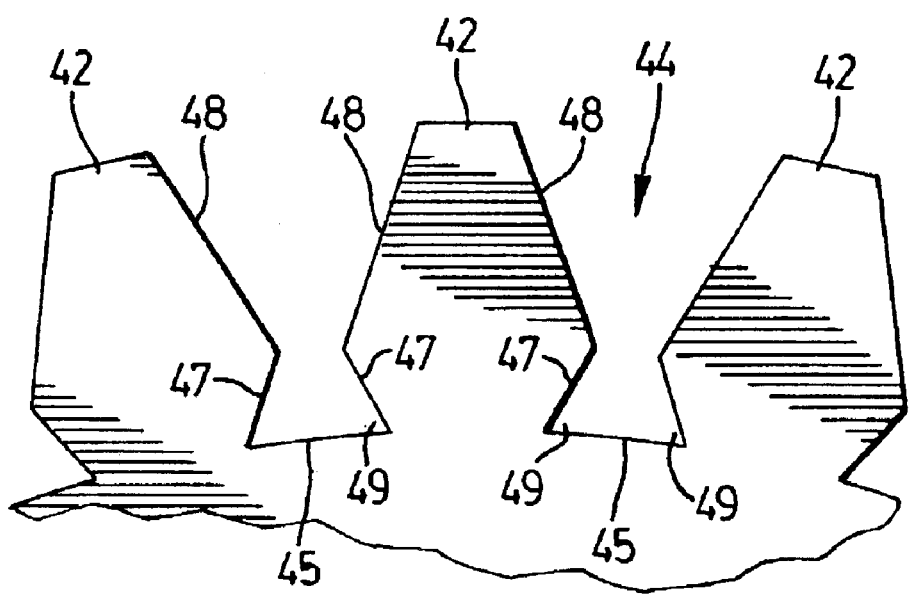
FIG. 5 is a close up view of the notches in the embodiment of FIG. 4.

FIG. 5 is a close-up view of the notches 44 located on the rim of the disc 40 in the alternate embodiment. Each notch is formed having a base wall 45 located towards the portion of the notch furthest away from the rim of the disc 40. The side walls of the notch have a lower wall 47 and an upper wall 48. The lower wall 47 must be angled such that an inverted "v" 49 is formed between the lower wall 47 and the base wall 45. When commercial or artificial hair 100 is placed in the notch 44, the commercial or artificial hair 100 slides between the lower wall 47 and the base wall 45 and is wedged in the inverted "v" 49. The positioning of the commercial or artificial hair 100 between the base wall 45 and the lower wall 47 prevents the commercial or artificial hair 100 from sliding out of the notch 44.

It is understood that the present embodiment described above is to be considered as illustrative and not restrictive. It will be obvious to those skilled in the art to make various changes, alterations and modifications to the invention described herein. To the extent that these variations, modifications and alterations depart from the scope and spirit of the appended claims, they are intended to be encompassed therein.

I claim:

1. Apparatus for holding and organizing bunches of commercial or artificial hair as it is used in braiding, weaving or similar hair adding techniques, said apparatus comprising a base, a pole extending from the base and means, mounted on said pole, for separately supporting bunches of the commercial or artificial hair, said supporting means comprising a disc having a rim, said rim being divided into a notched section and an unnotched section, said notched section comprising a plurality of radially extending spaced tabs with side edges, adjacent ones of said tabs defining hair bundle receiving notches therebetween, said side edges of said adjacent tabs comprising projections extending toward each other, each of said notches being divided into inner and outer portion by said projections, said inner notch portion having a substantially inverted "V" shape so as to retain a bunch of commercial or artificial hair therein, wherein said outer notch portion is defined by oppositely inclined sections of said side edges of said adjacent tabs.

2. Apparatus for holding and organizing bunches of commercial or artificial hair as it is used in braiding, weaving or similar hair adding techniques, said apparatus comprising a base, a pole extending from the base and means, mounted on said pole, for separately supporting bunches of the commercial or artificial hair, said supporting means comprising a disc having a rim, said rim being divided into a notched section and an unnotched section, said notched section comprising a plurality of radially extending spaced tabs with side edges, adjacent ones of said tabs defining hair bundle receiving notches therebetween, said side edges of said adjacent tabs comprising projections extending toward each other, each of said notches being divided into inner and outer portion by said projections, said inner notch portion having a substantially inverted "V" shape so as to retain a bunch of commercial or artificial hair therein, wherein said notched section comprises approximately a continuous half of said rim.

3. Apparatus for holding and organizing bunches of commercial or artificial hair as it is used in braiding, weaving or similar hair adding techniques, said apparatus comprising a base, a pole extending from the base and means, mounted on said pole, for separately supporting bunches of the commercial or artificial hair, said supporting means comprising a disc having a rim, said rim being divided into a notched section and an unnotched section, said notched section comprising a plurality of radially extending spaced tabs with side edges, adjacent ones of said tabs defining hair bundle receiving notches therebetween, said side edges of said adjacent tabs comprising projections extending toward each other, each of said notches being divided into inner and outer portion by said projections, said inner notch portion having a substantially inverted "V" shape so as to retain a bunch of commercial or artificial hair therein, wherein said disc is mounted on said pole at an angle such that the rim of one half of said disc is situated further away from said base than the other half of said disc and wherein said notched section is formed in said rim a continuous half said disc.

4. Apparatus for holding and organizing bunches of commercial or artificial hair as it is used in braiding, weaving or similar hair adding techniques, said apparatus comprising a base, a pole extending from the base and means, mounted on said pole, for separately supporting bunches of the commercial or artificial hair, said supporting means comprising a disc having a rim, said rim being divided into a notched section and an unnotched section, said notched section comprising a plurality of radially extending spaced tabs with side edges, adjacent ones of said tabs defining hair bundle receiving notches therebetween, said side edges of said adjacent tabs comprising projections extending toward each other, each of said notches being divided into inner and outer portion by said projections, said inner notch portion having a substantially inverted "V" shape so as to retain a bunch of commercial or artificial hair therein wherein said outer notch portion is defined by oppositely inclined sections of said side edges of said adjacent tabs, wherein said base comprises a clamp.

* * * * *